(12) United States Patent
Ou et al.

(10) Patent No.: US 9,350,259 B2
(45) Date of Patent: May 24, 2016

(54) SYNCHRONOUS RECTIFIER CONTROL FOR A DOUBLE-ENDED ISOLATED POWER CONVERTER

(71) Applicant: Analog Devices Global, Hamilton (BM)

(72) Inventors: Yingyang Ou, Shenzhen (CN); Renjian Xie, Shenzhen (CN); Qingyi Huang, Shenzhen (CN)

(73) Assignee: Analog Devices Global, Hamilton (BM)

( * ) Notice: Subject to any disclaimer, the term of this patent is extended or adjusted under 35 U.S.C. 154(b) by 212 days.

(21) Appl. No.: 13/955,971

(22) Filed: Jul. 31, 2013

(65) Prior Publication Data
US 2015/0036390 A1    Feb. 5, 2015

(51) Int. Cl.
*H02M 3/335*    (2006.01)
*H02M 3/337*    (2006.01)

(52) U.S. Cl.
CPC .......... *H02M 3/337* (2013.01); *H02M 3/33592* (2013.01)

(58) Field of Classification Search
USPC ............. 363/16, 17, 21.06, 21.14, 24, 25, 26, 363/89, 125, 127
See application file for complete search history.

(56) References Cited

U.S. PATENT DOCUMENTS

| | | | |
|---|---|---|---|
| 5,453,923 A | 9/1995 | Scalais et al. | |
| 5,811,895 A | 9/1998 | Suzuki et al. | |
| 5,818,704 A * | 10/1998 | Martinez | 363/21.06 |
| 5,991,171 A | 11/1999 | Cheng | |
| 6,414,861 B1 | 7/2002 | Matsumoto et al. | |
| 6,426,884 B1 | 7/2002 | Sun | |
| 6,438,009 B2 | 8/2002 | Assow | |
| 6,515,463 B2 | 2/2003 | Ling | |
| 6,618,274 B2 | 9/2003 | Boylan et al. | |
| 6,771,059 B1 | 8/2004 | Zwicker | |
| 6,778,412 B2 | 8/2004 | Nagai et al. | |
| 6,859,020 B2 | 2/2005 | Baldwin et al. | |
| 6,995,987 B2 | 2/2006 | Song | |
| 7,166,992 B2 | 1/2007 | Kudo et al. | |
| 7,450,402 B2 | 11/2008 | Jitaru | |
| 7,501,715 B2 | 3/2009 | Saeueng et al. | |
| 7,535,210 B2 | 5/2009 | Wang | |
| 7,557,545 B2 | 7/2009 | Naka et al. | |
| 7,589,982 B2 | 9/2009 | Wang et al. | |
| 7,667,918 B2 | 2/2010 | Hayashi et al. | |
| 7,696,739 B2 | 4/2010 | Bacchi et al. | |
| 7,733,068 B2 | 6/2010 | Noda | |
| 7,768,807 B2 * | 8/2010 | Chen et al. | 363/127 |
| 7,994,757 B2 | 8/2011 | Motomori | |
| 8,373,403 B1 | 2/2013 | Radovic | |
| 2001/0024378 A1 | 9/2001 | Assow | |
| 2002/0145891 A1 | 10/2002 | Ling | |

(Continued)

*Primary Examiner* — Nguyen Tran
(74) *Attorney, Agent, or Firm* — Schwegman Lundberg & Woessner, P.A.

(57) ABSTRACT

An apparatus comprises a power converter circuit and a control circuit. The power converter circuit includes a primary circuit side and a secondary circuit side. The primary circuit side includes a plurality of primary switches, and the secondary circuit side includes a plurality of synchronous rectifiers and an inductor. The control circuit is configured to operate the synchronous rectifiers synchronously with the primary switches when inductor current at the inductor is greater than or equal to a reference inductor current, and operate the synchronous rectifiers in a bidirectional mode when the inductor current is less than the reference inductor current, wherein energy is delivered from the primary side to the secondary side and from the secondary side to the primary side during the bidirectional mode.

16 Claims, 10 Drawing Sheets

(56) References Cited

U.S. PATENT DOCUMENTS

| | | |
|---|---|---|
| 2003/0048644 A1 | 3/2003 | Nagai et al. |
| 2003/0067794 A1 | 4/2003 | Boylan et al. |
| 2003/0067795 A1 | 4/2003 | Dubhashi |
| 2003/0094931 A1 | 5/2003 | Renyolds |
| 2004/0070378 A1 | 4/2004 | Baldwin et al. |
| 2005/0078491 A1 | 4/2005 | Song |
| 2005/0270001 A1 | 12/2005 | Jitaru |
| 2006/0164057 A1 | 7/2006 | Kudo et al. |
| 2006/0250724 A1 | 11/2006 | Hayashi et al. |
| 2006/0274559 A1 | 12/2006 | Saeueng et al. |
| 2007/0013351 A1 | 1/2007 | Naka et al. |
| 2008/0055944 A1 | 3/2008 | Wang |
| 2008/0079409 A1 | 4/2008 | Motomori et al. |
| 2008/0094861 A1 | 4/2008 | Wang |
| 2008/0170418 A1 | 7/2008 | Nishiyama et al. |
| 2008/0191677 A1 | 8/2008 | Bacchi et al. |
| 2010/0046250 A1 | 2/2010 | Noda |
| 2011/0188269 A1* | 8/2011 | Hosotani ............ 363/21.06 |
| 2011/0273155 A1 | 11/2011 | Weir |
| 2012/0092896 A1* | 4/2012 | Hachiya et al. ............ 363/16 |
| 2012/0294052 A1 | 11/2012 | Reddy et al. |
| 2012/0327688 A1 | 12/2012 | Guthrie et al. |
| 2013/0044519 A1* | 2/2013 | Teraura et al. ............ 363/17 |
| 2013/0063104 A1 | 3/2013 | Gibson |
| 2013/0322128 A1* | 12/2013 | Takegami ........ H02M 3/33507 363/17 |
| 2014/0204616 A1* | 7/2014 | Biebach et al. ............ 363/17 |
| 2014/0254206 A1* | 9/2014 | Ou et al. ............ 363/21.01 |

\* cited by examiner

SYNCHRONOUS RECTIFIER CONTROL FOR A DOUBLE-ENDED ISOLATED POWER CONVERTER

BACKGROUND

Electronic power systems typically consist of one or more power converters controlled by integrated circuits. The power converters receive an electrical input having an input magnitude, frequency, and/or phase at an input side and convert the electrical input to an electrical output at an output side having a magnitude, frequency, and/or phase. An isolated power converter includes an isolation transformer to electrically isolate the power converter output stage or secondary side from the input stage or primary side by arranging the isolation transformer between the primary side and the secondary side. Transformers can be characterized by a hysteresis curve of magnetic flux density; often called the B-H curve. The B-H curve has four quadrants. During operation of the power converter, if the flux density in the transformer is characterized by only the first quadrant of the B-H curve, the isolated power converter is classified as single-ended. If the flux density in the transformer is characterized by the first quadrant and the third quadrant of the B-H curve, the isolated power converter is classified as double-ended. In general, a double-ended power converter requires a smaller transformer core than a single-ended power converter and does not need an additional reset winding.

Typically, the output stage of the isolated power converter includes a diode rectifier circuit. These rectifiers can be a source of energy loss in a power converter. The diode rectifiers can be replaced with synchronous rectifiers implemented with semiconductor switches (e.g., a metal oxide field effect transistor or MOSFET) having a lower on-state resistance to improve efficiency of the rectifier. However, there can be drawbacks to using synchronous rectifiers because of the bidirectional current flowing capability of the semiconductor switches.

In order to achieve the minimum conduction resistor, the timing of the synchronous rectifiers of the secondary side is complementary with the timing of the primary switches of the primary side. During startup, the synchronous rectifiers may discharge energy stored in the output capacitor of the power converter if the output capacitor is pre-charged. This discharged energy can be transferred from the secondary side to the primary side through the synchronous rectifiers if there is a large enough decrease in the input voltage. If the decrease in the input voltage is large enough, a large reverse current can be transferred from the output to the input and can cause damage to internal circuit components. If multiple converters are connected in parallel, the synchronous rectifiers in different converters can form a loop where a circulating current flows; leading to a large power loss even the output load is very light. Additionally, reverse current flow to the input can increase the root mean square (RMS) value of current flowing in the primary stage and decrease the efficiency of the power converted during light load operation. The present inventors have recognized a need for improved performance of power converter circuits.

Overview

This document relates generally to switching power converters and methods of their operation. An apparatus example includes a power converter circuit and a control circuit. The power converter circuit includes a primary circuit side and a secondary circuit side. The primary circuit side includes a plurality of primary switches, and the secondary circuit side includes a plurality of synchronous rectifiers and an inductor. The control circuit is configured to operate the synchronous rectifiers synchronously with the primary switches when inductor current at the inductor is greater than or equal to a reference inductor current, and operate the synchronous rectifiers in a bidirectional mode when the inductor current is less than the reference inductor current, wherein energy is delivered from the primary side to the secondary side and from the secondary side to the primary side during the bidirectional mode.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
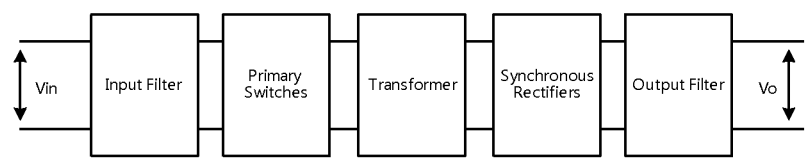
FIG. 1 shows a block diagram of an example of an isolated power converter.

FIG. 1 shows a block diagram of an example of an isolated power converter. The power converter includes an input filter stage, a primary stage that includes primary switches, an isolation transformer, a secondary stage that includes a rectifier circuit having synchronous rectifiers, and an output filter stage. As explained previously herein, a power converter transfers electrical energy from the input on the primary stage side to the output of the secondary stage side.

Figure 2A:
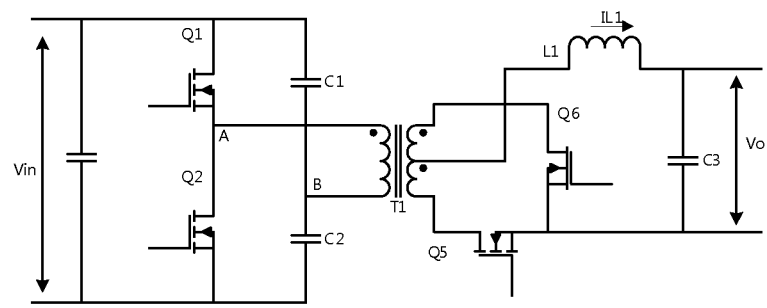
FIGS. 2A-2F show some examples of different circuit topologies for isolated power converters.
Figure 2B:
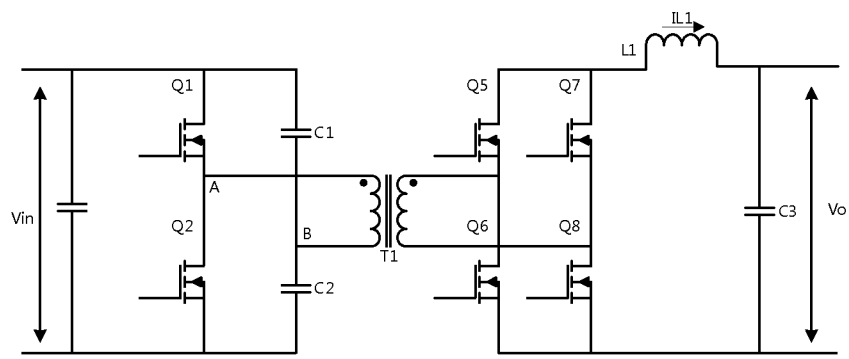
Figure 2C:
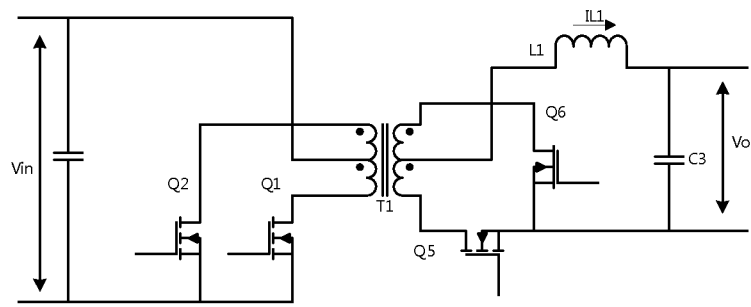
Figure 2D:
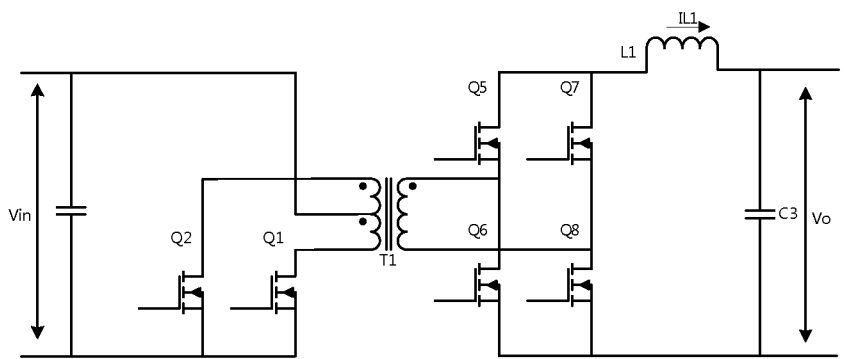
Figure 2E:
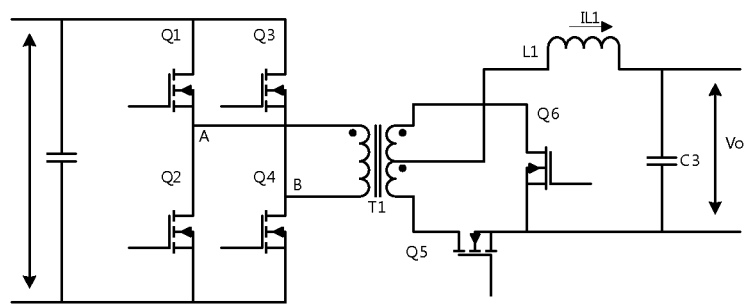
Figure 2F:
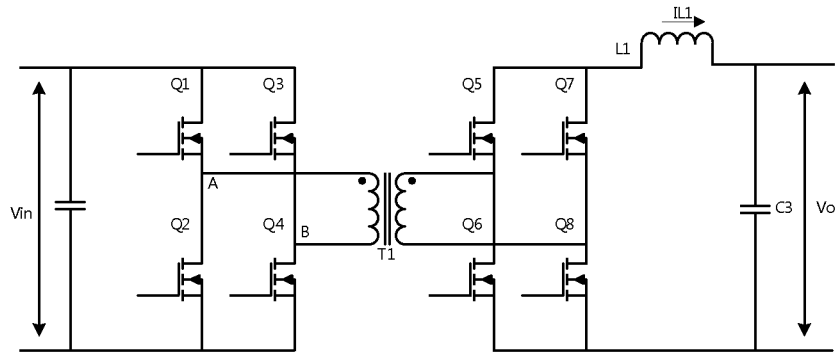
Figure 3A:
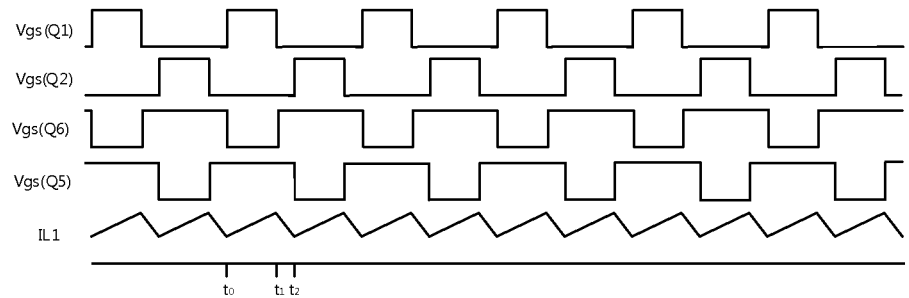
FIGS. 3A-3F show examples of drive signals used to activate the switches in the examples of FIGS. 2A-2F, respectively.
Figure 3B:
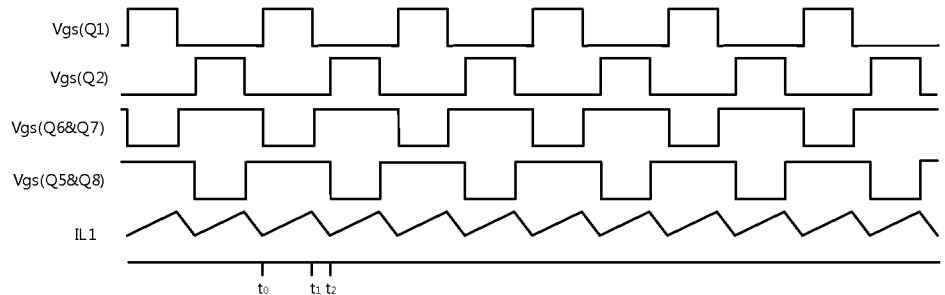
Figure 3C:
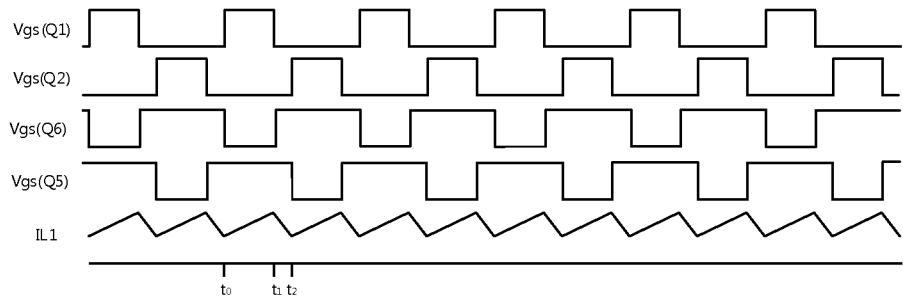
Figure 3D:
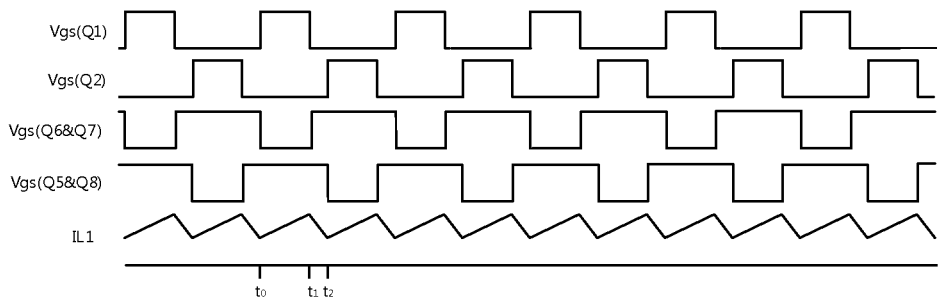
Figure 3E:
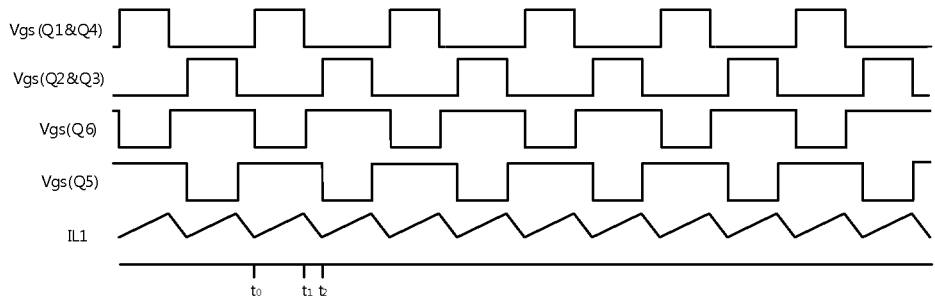
Figure 3F:
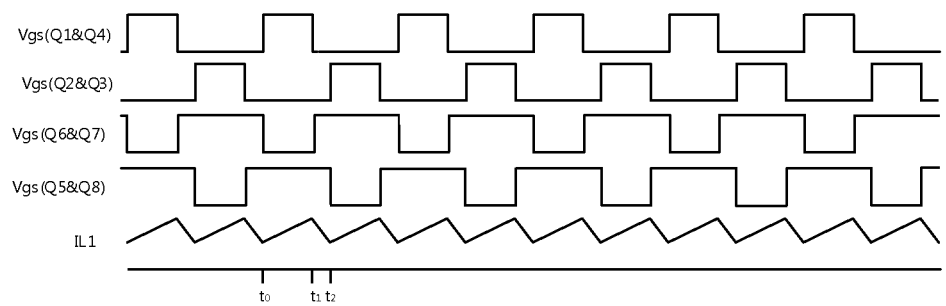

FIGS. 2A-2F show some examples of different circuit topologies for isolated power converters. The circuits include a rectifier circuit in the secondary stage. Semiconductor switches are used in the rectifier circuits to minimize the conduction loss. FIG. 2A shows an example of an isolated power converter that includes a half-bridge converter topology and a full wave rectifier circuit. FIG. 2B shows an example of an isolated power converter that includes a half-bridge converter topology and a full bridge rectifier circuit. FIG. 2C shows an example of an isolated power converter that includes a push-pull converter topology and a full wave rectifier circuit. FIG. 2D shows an example of an isolated power converter that includes a push-pull converter topology and a full bridge rectifier circuit. FIG. 2E shows an example of an isolated power converter that includes a full bridge converter topology and a full wave rectifier circuit. FIG. 2F shows an example of an isolated power converter that includes a full bridge converter topology and a full bridge rectifier circuit.

FIGS. 3A-3F show examples of drive signals used to activate the switches in the examples of FIGS. 2A-2F, respectively. To minimize the conduction loss in the rectifier circuits, the signals used to activate the synchronous rectifiers are complementary to the drive signals used to activate the primary switches. Driving the primary switches and synchronous rectifiers in this way can be referred to as a fully synchronous mode.

As shown in FIGS. 3A-3F, when a primary switch is driven active or "ON," there is a synchronous rectifier driven ON. For the full bridge synchronous rectifier examples shown in FIGS. 2B, 2D and 2F, two synchronous rectifiers located diagonally that are driven ON (e.g., rectifiers Q6 sand Q7 are driven active at the same time, and switches Q5 and Q8 are driven active at the same time). As shown in FIGS. 3A-3F, during the time interval $t_0$~$t_1$, the active synchronous rectifier or rectifiers conduct electrical energy from the primary side to secondary side, and the current in inductor L1 increases.

During the time interval from $t_1$~$t_2$, all of the primary switches are driven inactive or "OFF," and all of the synchronous rectifiers are driven as "ON" resulting in freewheeling of the inductor current which decreases during this time interval.

Freewheeling refers to current flowing in the secondary side by discharge of energy stored in the inductor rather than from energy transferred from the primary side. With a heavy load requiring high current, the reduced conduction resistance of the synchronous rectifiers minimizes the conduction loss.

There can be drawbacks to running an isolated power converter in the fully synchronous mode. The pulse width of the primary switches is a small value at start-up and expands during the start-up process (stated another way, the primary switches are driven with a small duty cycle and the duty cycle expands as start-up progresses and the current in the inductor L1 increases). Because the drive signals for synchronous rectifiers are complementary to the primary switches, the drive signals for the synchronous rectifiers have a large pulse width (large duty cycle) at start-up and the pulse width is reduced as L1 increases during the start-up process. As shown in the examples of FIGS. 3A-3F, there is a large overlap time in the drive signals for the synchronous rectifiers in which all the synchronous rectifiers are on. If there is any residual voltage at the output (e.g., at the output capacitor C3 of the examples of FIG. 2A-2F), this energy will be discharged during this overlapping time causing a large reverse current that may result in a large voltage dip on the output voltage and make the output non-monotonic.

Figure 4:
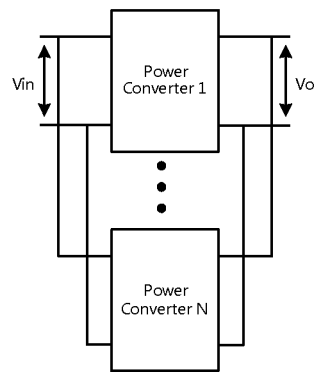
FIG. 4 shows a block diagram of an example of multiple power converters connected in parallel.

Additionally, multiple power converters can be connected in parallel as shown in FIG. 4. The parallel connection creates a common bus at the output. If there is any residual voltage at the outputs of the parallel power converters, any converter that starts up later than the others will sink the current from the common bus, which may pull down this bus voltage if there is not any circuit protection to prevent this. Further, for multiple converters connected in parallel, practical limits in the accuracy of current sharing among the individual power converters and differences in the set points of the output voltages among different power converters can cause a circulating current to flow during the synchronous mode. The circulating current can cause a large power loss even when for a light load with low current. To overcome these drawbacks the operating mode of a power converter circuit, or multiple power converter circuits in parallel, can be changed according to the circuit conditions.

Figure 5:
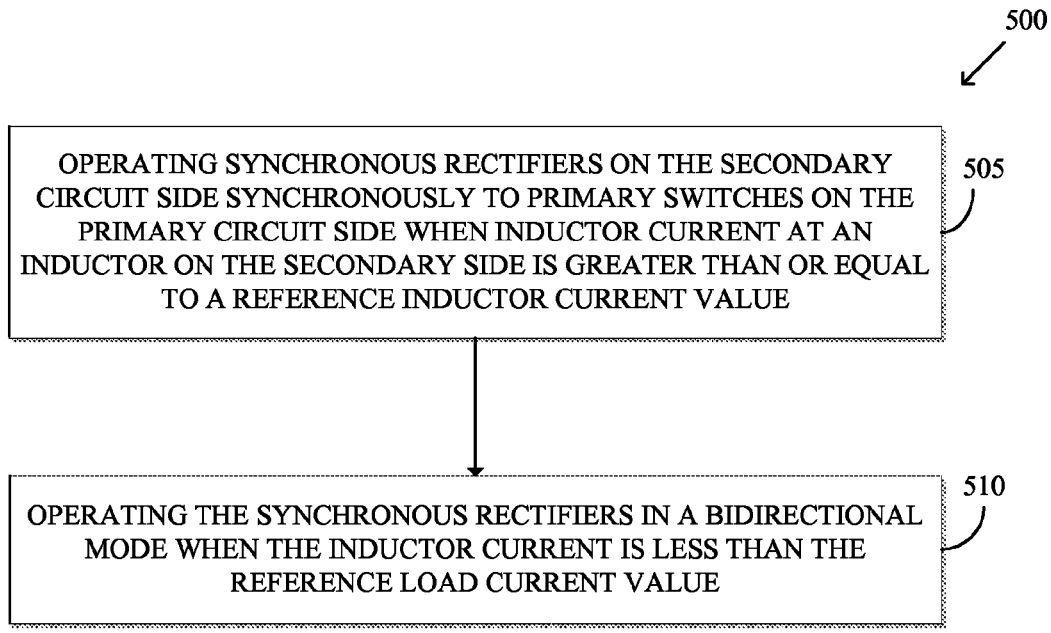
FIG. 5 shows a flow diagram of an example of a method of operating a power converter circuit.

FIG. 5 shows a flow diagram of an example of a method 500 of operating a power converter circuit having a primary circuit side and a secondary circuit side. At block 505, synchronous rectifiers on the secondary circuit side are operated synchronously to primary switches on the primary circuit side when the inductor current at the inductor on the secondary side is greater than or equal to a reference inductor current value. At block 510, the synchronous rectifiers are operated in a bidirectional mode when the inductor current is less than the reference load current value. During the bidirectional mode, energy is delivered from the primary circuit side to the secondary circuit side and from the secondary circuit side to the primary circuit side. The synchronous rectifiers are driven using a specified duty cycle or on-time instead of varying the duty cycle with the inductor current.

Figure 6:
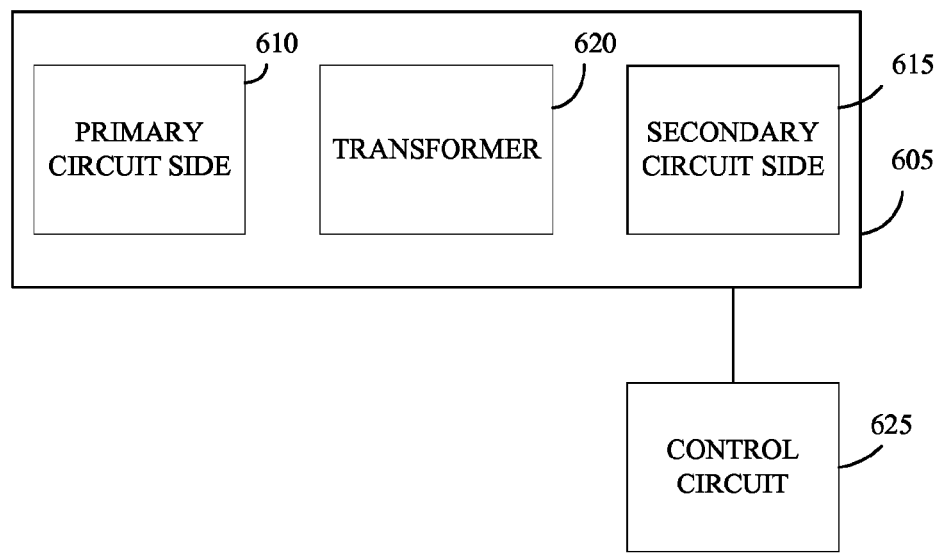
FIG. 6 shows a block diagram of portions of example of an electronic device that minimizes conduction loss when transferring electrical energy.
Figure 7A:
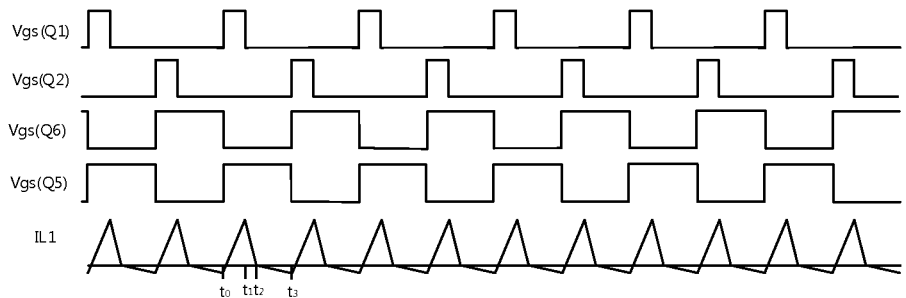
FIGS. 7A-7F show additional examples of drive signals used to activate the switches in the examples of FIGS. 2A-2F, respectively.
Figure 7B:
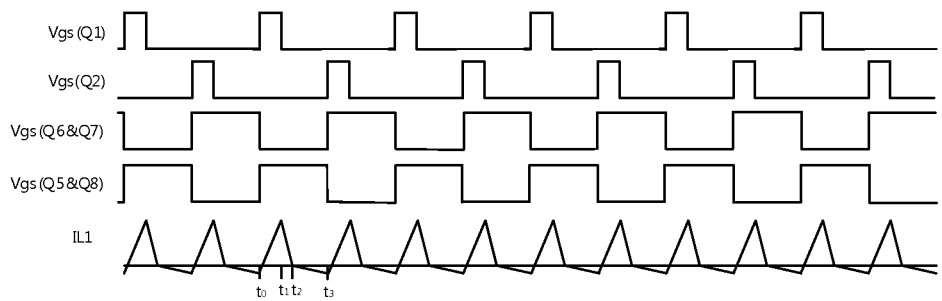
Figure 7C:
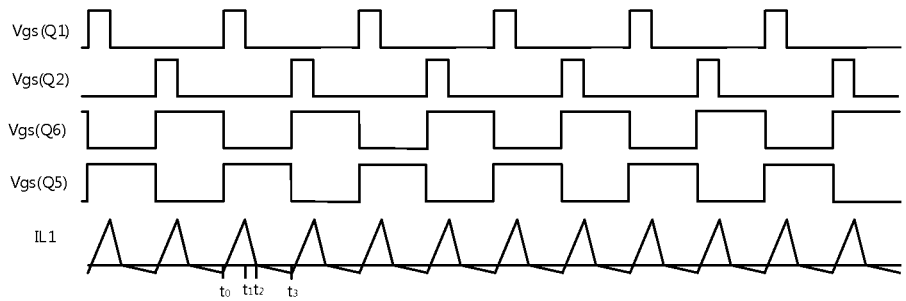
Figure 7D:
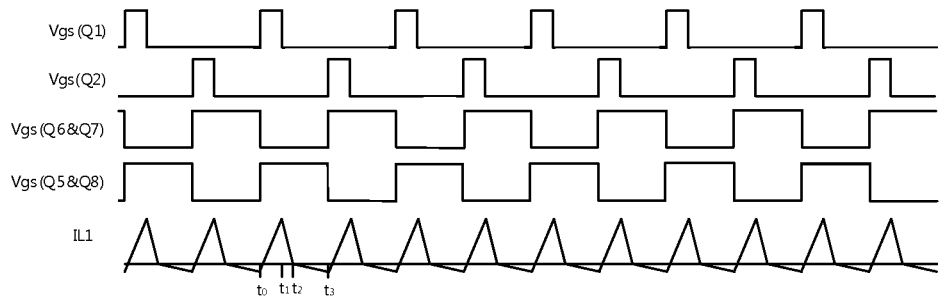
Figure 7E:
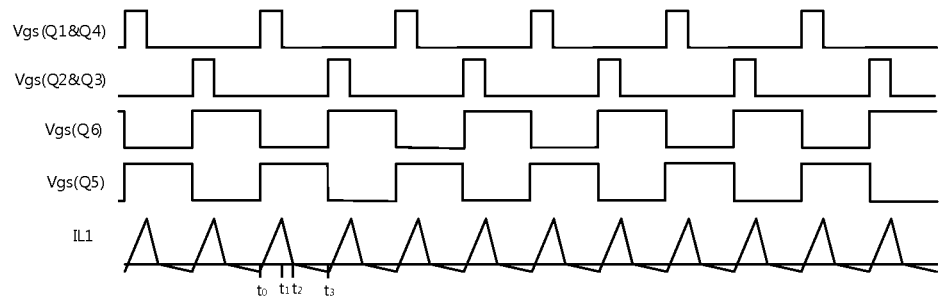
Figure 7F:
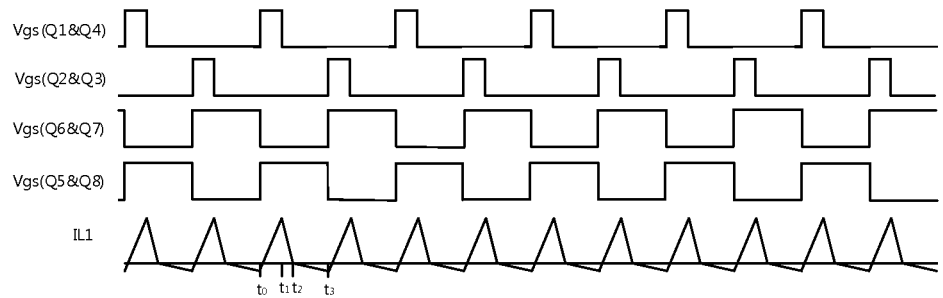

FIG. 6 shows a block diagram of portions of example of an electronic device that minimizes conduction loss when transferring electrical energy. The device includes a power converter circuit 605 that includes a primary circuit side 610 and a secondary circuit side 615. Electrical isolation between the primary circuit side 610 and the secondary circuit side 615 may be provided by an isolation transformer 620. The topology of the power converter circuit can be a double-ended power converter that provides bidirectional excitation to the core of the isolation transformer 620. The primary circuit side 610 includes a plurality of primary switches and the secondary circuit side 615 includes a plurality of synchronous rectifiers and an inductor. The circuit topology of the power converter circuit can be any one of a half bridge converter, a push-pull converter, or a full bridge converter. The synchronous rectifiers of the secondary circuit side 615 are included in a rectifier circuit and the topology of the rectifier circuit can be a full wave or a full bridge rectifier circuit.

The device also includes a control circuit 625. The control circuit 625 can be configured by hardware such as logic circuits or a state machine to perform the functions described. The control circuit 625 can include an application specific integrated circuit (ASIC), or a processor (e.g., a microprocessor) configured by software or firmware to perform the functions described. The control circuit 625 can be any combination of hardware, software, and firmware. The power converter circuit 605 and the control circuit 625 may be included in an integrated circuit. The integrated circuit may include contact pads for connection to an external inductor and may include contact pads for connection to an external isolation transformer.

The control circuit 625 operates the synchronous rectifiers synchronously with the primary switches when inductor current at the inductor is greater than or equal to a reference inductor current. For example, the control circuit 625 may provide drive signals to both the primary switches and the synchronous rectifiers. The drive signals for the synchronous rectifiers may be logically complementary to the drive signals for the primary switches during the synchronous mode. An example of the drive signals in the synchronous mode can be found in FIGS. 3A-3F. As shown in FIGS. 3A-3F, the synchronous mode includes a plurality of phases, and wherein all of the synchronous rectifiers are enabled during at least one phase of the synchronous mode. Stated another way, there is a phase during the fully synchronous mode where the activating drive signals for the synchronous rectifiers overlap.

The control circuit 625 also operates the synchronous rectifiers in a bidirectional mode when the inductor current is less than the reference inductor current. Electrical energy can be delivered from the primary side to the secondary side and from the secondary side to the primary side during the bidirectional mode. The inductor current can be monitored at the contact pads for the inductor or at another location of the circuit.

FIGS. 7A-7F show some examples of drive signals to operate the circuits of FIGS. 2A-2F, respectively, in the bidirectional mode. During the bidirectional mode, the control circuit 625 of FIG. 6 may enable the synchronous rectifiers according to a specified duty cycle that is independent of the value of the inductor current. Typically, the bidirectional mode does not include an interval where all of the synchronous rectifiers turned on at the same time. In the bi-directional mode, a power converter circuit may operate according to three different modes or phases.

Figure 8A:
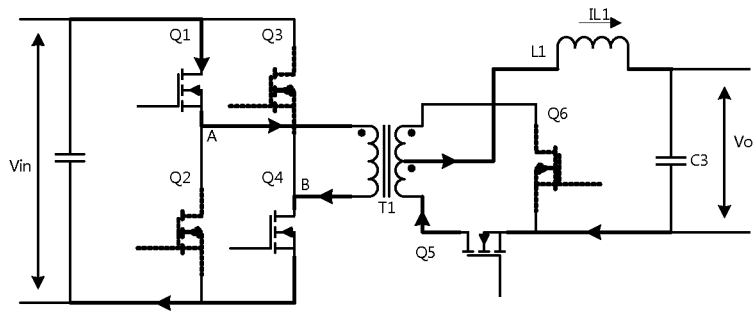
FIGS. 8A-8C illustrate an example of the circuit topology for a full bridge power converter operating in multiple modes.

Phase 1: As shown in FIGS. 7A-7F, during the time interval $t_0 \sim t_1$ the primary switches are turned on and electrical energy is delivered from the input to the output. The inductor current (shown as $I_{L1}$ in FIGS. 7A-7F) increases with a slew rate that is determined by the input voltage, the output voltage, the turn ratio of the isolation transformer, and the inductance of the output inductor $L_1$. At time $t_1$, the inductor current reaches a maximum value and the primary switches are turned off by the control circuit 625 to stop the delivery of electrical energy to the secondary circuit side 615. FIG. 8A shows the circuit topology for a full bridge power converter with a full wave rectifier circuit on the secondary circuit side (also shown in FIG. 2E). The bold line in FIG. 8A shows an active circuit path for phase 1 of bidirectional mode. Only a portion of the primary switches and only a portion of the synchronous rectifiers are enabled at any one time to provide energy from the primary circuit side to the secondary circuit side.

Figure 8B:
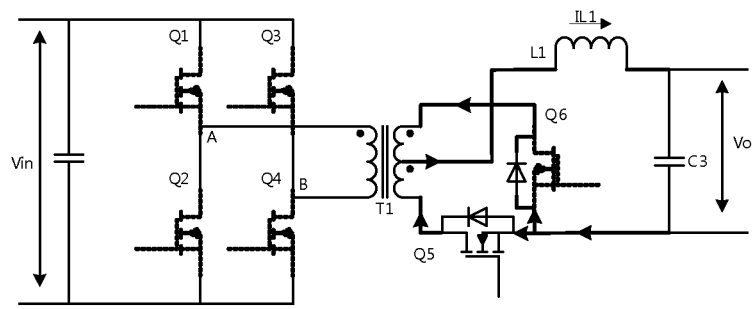

Phase 2: Returning to FIGS. 7A-7F, during time interval $t_1 \sim t_2$ the primary switches are turned off or disabled and only a portion of the synchronous rectifiers are enabled and remain active. The inductor current $I_{L1}$ is positive and decreases to zero at time $t_2$. As shown in FIG. 8B, electrical energy is not transferred to the secondary circuit side because the primary switches are turned off. The synchronous rectifier Q5 is still ON, remains active, and continues to conduct the positive inductor current, which is freewheeling current. The positive current also flows through the body diode of synchronous rectifier Q6 even though Q6 is OFF. In some examples, an external diode can be placed in parallel with synchronous rectifiers Q6 and Q5 to conduct the positive current during this phase and the phase of a subsequent half cycle. The bold line in FIG. 8B shows the active current path for this phase. It can be seen that the current flowing Q5 and Q6 causes a short circuit across the transformer T1 and the output voltage of the power converter may be applied across the inductor directly.

Figure 8C:
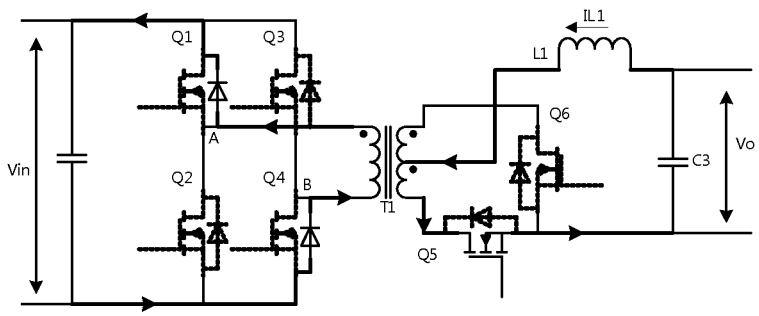

Phase 3: As shown in FIGS. 7A-7F, during the time interval $t_2 \sim t_3$ the primary switches remain turned OFF and are disabled by the control circuit 625, at least a portion of the synchronous rectifiers are still driven ON and remain enabled, and the inductor current goes negative. The bold line in FIG. 8C shows the active current path for this phase. As shown in FIG. 8C, synchronous rectifier Q5 is still driven ON. Synchronous rectifier Q6 is OFF, but because the inductor current is negative, the body diode of Q6 (or an external diode placed in parallel) is reversed biased and current is blocked through Q6. Because of the reverse biasing of Q6, the transformer T1 is no longer short-circuited, and the transformer T1 is effectively in series with the inductor L1. During this phase, the energy stored in the output capacitor C3 may be discharged via the circuit loop including $L_1$, Q5, $T_1$, body diodes of Q1 and Q4 (they also may be external diodes in parallel with Q1 and Q4). The energy can be provided from the output on the secondary side to the input on the primary side. Because the input capacitor typically is charged during normal operation, the negative voltage difference across the inductor is very low and the discharge rate of the output capacitor, as well as the rate of inductor current during this interval, is very slow and the reverse current is suppressed in this case.

After time $t_3$, the control circuit 625 drives the other switches Q2, Q3 and Q6 to start the subsequent half cycle and the power converter operates through the same or similar phases.

Compared with the fully synchronous mode, the bidirectional mode does not typically include an interval when all of the synchronous rectifiers are driven ON, and the control circuit 625 may enable less than all of the synchronous rectifiers at any one time during the bidirectional mode. During the freewheeling period, when the inductor current approaches zero and is going to be negative, the primary side input capacitor may be included in the discharging loop to suppress any reverse current. While in the fully synchronous mode, the transformer T1 is shorted and the converter sinks the current from the output via the output inductor and synchronous rectifiers.

As explained previously herein, the primary side input capacitor (at Vin) is involved during the freewheeling loop to suppress reverse current. The reverse current can be controlled if the input voltage has a low enough magnitude that won't cause any adverse results. However, in some cases, such as the input voltage dip, interrupt, and short-circuit tests required by some circuit test standards, this bidirectional mode cannot work normally once the input voltage is lower than a certain value. For the example shown in FIG. 8C, if the input Vin is shorted during this interval, the output capacitor C3 will discharge the energy via $T_1$, and the body diodes of Q1 and Q4 (or the external diodes in parallel with Q1 and Q4 if they are adopted). The larger the decrease in input voltage, the larger the resulting reverse current.

In order to prevent reverse current that may be harmful, a third mode "diode mode" can be used. As shown in the example of FIGS. 8A-8C, the harmful reverse current can be eliminated by immediately turning off all the synchronous rectifiers when the input voltage drops below a specified level. Otherwise, it may cause some undesirable damage to the circuits. To block the reverse current flowing from output to the input completely, the control circuit 625 disables all the driving signals for synchronous rectifiers when the input voltage is less than the specified input voltage value. Diode mode can block the reverse current flowing from output to the input completely.

Following the principles mentioned above, the control circuit 625 switches among these three modes under certain conditions determined from sensed circuit parameters. The control circuit 625 may include a mode selection module to select among the three modes.

Figure 9:
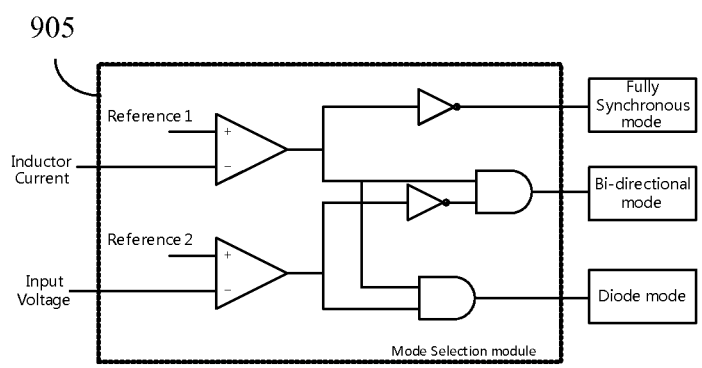
FIG. 9 shows an example of a mode selection module.

FIG. 9 shows an example of a mode selection module 905. The functions described can be performed with any combination of hardware circuits, firmware, or software. There are two sensed signals sensed provided to the mode selection module 905; input voltage and inductor current. The two signals are compared with two thresholds respectively. The comparisons may generate two signals to select which mode is activated. Under the heavy load condition, the inductor current is greater than a specified reference inductor current value (shown as Reference 1 in FIG. 9). The mode selection module 905 selects the fully synchronous mode to achieve the possible maximum efficiency.

Under light load conditions, the inductor current is less than the specified reference inductor current value. If the input voltage is greater than a specified input voltage value (shown as Reference 2 in FIG. 9) under the light load conditions, the mode selection module 905 selects the bidirectional mode. When the input voltage is less than the specified input voltage value, then the diode mode is activated and reverse current is blocked. In certain examples, the input voltage is less than the specified input voltage value and the inductor current is less than the specified reference inductor current value. Generally, if the input voltage increases back to the normal operation range (e.g., increases to greater than the Reference 2 in FIG. 9), the bidirectional mode can be activated again.

The reference inductor current value can be specified as a set predetermined value or can be programmable (e.g., Reference 1=$I_{pre1}$). Setting the reference to a value less than zero can allow for a certain amount of revers current during normal operation. In certain examples, the reference inductor current value is specified as a dynamic reference value calculated by the control circuit 625. The inductor current may also be monitored by sensing a voltage that is proportional to the inductor current (e.g., Reference 1=$V_{pre1}$). For instance, a circuit component such as a sense resistor can be added to the power convert circuit and the voltage across the circuit component can be sensed. In certain examples, the reference inductor current value is specified as a dynamic reference value calculated by the control circuit 625 using a sensed input voltage or Reference 1=$(V_{pre1})V_{in})(k)$ where $V_{pre1}$ is a predetermined value that may be negative, $V_{in}$ is the input voltage, and k is a coefficient.

The reference input voltage value can also be specified as a set predetermined value (e.g., Reference 2=$V_{pre2}$), or can be specified as a dynamic reference value calculated by the control circuit 625. Because the output voltage $V_o$ may vary over a large range, the Reference 2 can also be varied with the output voltage. In certain examples, the reference input voltage value is calculated according to Reference 2=$(V_o)(m)\pm(n)$, where the Reference 2 is the threshold used for the input voltage comparison, $V_o$ is the output voltage, and m, n are two coefficients. The m can be the transformer turn ratio or the product of the transformer turn ratio and a coefficient, and the n can be used to give the $(V_o)$ (m) product a negative or positive offset.

The operation of a power converter circuit in multiple modes has several advantages. For instance, the high efficiency under heavy load conditions is preserved when operating in the fully synchronous mode. The bidirectional mode can limit or suppress reverse current during startup conditions with a pre-charged output capacitor or eliminate the circulating current when multiple power converter circuits are connected in parallel. Allowing a limited or controlled reverse current to flow during the freewheeling period of the power converter circuit in bidirectional mode may improve circuit regulation and performance of the circuit under a dynamic load. Changing to bidirectional mode under light load conditions may also reduce power loss as compared to a fully synchronous mode under light load conditions. Bidirectional mode can be easily implemented because the timing of the drive signals is predetermined and not dependent on the value of the inductor current. Also, bidirectional mode does not require any device with a high breakdown voltage or require an accurate zero-crossing sensor for the inductor current; only comparators can be used. The diode mode may only be activated when the input voltage is too low. Diode mode can eliminate reverse current completely and transfer as much energy as possible to the output under this condition. Having a diode mode capability does not affect regulation in the fully synchronous mode or bidirectional mode.

The several examples described herein can be applied to all double-ended power converter circuit topologies employing synchronous rectifiers. The sensed input voltage can be any voltage on either the primary side or secondary side that may reflect the actual input voltage or have a relationship with the input voltage. The sensed input voltage may be compensated before the comparison is made to determine the operating mode. Similarly, some compensation may be applied to the sensed inductor current before the comparison is made. The inductor current may not only be monitored using a current but may also be monitored using a voltage which represents the inductor current. The threshold values for comparisons in determining a circuit operating mode can be specified as predetermined values by being dynamically regulated. The control circuit 625 may have a module for decoupling circuit noise and may have a module for applying a specified time delay before determining the operating mode.

Additional Notes

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
a power converter circuit including a primary circuit side and a secondary circuit side, wherein the primary circuit side includes a plurality of primary switches, wherein the secondary circuit side includes a plurality of synchronous rectifiers and an inductor; and
a control circuit configured to:
operate the synchronous rectifiers synchronously with the primary switches when inductor current at the inductor is greater than or equal to a reference inductor current;
operate the synchronous rectifiers in a bidirectional mode when the inductor current is less than the reference inductor current, wherein energy is delivered from the primary side to the secondary side and from the secondary side to the primary side during the bidirectional mode; and
operate the synchronous rectifiers in a diode mode when an input voltage to the primary side is less than a specified input voltage value, wherein the specified input voltage value is dynamic reference value selected according to the output voltage, and wherein the control circuit disables the synchronous rectifiers during the diode mode.

2. The apparatus of claim 1, wherein, during the bidirectional mode, the control circuit is configured to enable the synchronous rectifiers according to a specified duty cycle that is independent of the value of the inductor current.

3. The apparatus of claim 1, wherein the control circuit is configured to enable less than all of the synchronous rectifiers at any one time during the bidirectional mode.

4. The apparatus of claim 1, including a capacitor at the output of the secondary circuit side, wherein the control circuit is configured to operate the primary side and the secondary side in a plurality of phases when in the bidirectional mode, including:
a first phase in which only a portion of the primary switches and only a portion of the synchronous rectifiers are enabled at any one time to provide energy from the primary circuit side to the secondary circuit side;
a second phase in which only a portion of the synchronous rectifiers are enabled at any one time and the primary switches are disabled and energy on the secondary circuit side is provided by energy stored by the inductor; and
a third phase in which at least a portion of the synchronous rectifiers are enabled at any one time and the primary switches are disabled and energy from an output capacitor on the secondary circuit side is provided to the primary circuit side.

5. The apparatus of claim 1, wherein the power converter circuit includes electrical isolation between the primary circuit side and the secondary circuit side, and the secondary circuit side includes one of a full wave synchronous rectifier topology or a full bridge synchronous rectifier topology.

6. The apparatus of claim 1, wherein the power converter circuit includes electrical isolation between the primary circuit side and the secondary circuit side, and wherein the primary circuit side includes one of a half bridge circuit topology, a push-pull circuit topology, or a full bridge circuit topology.

7. The apparatus of claim 1, wherein the power converter circuit includes an isolation transformer to electrically isolate the secondary side circuit from the primary side circuit, and wherein a topology of the power converter circuit is a double-ended power converter that provides bidirectional excitation to a core of the isolation transformer.

8. The apparatus of claim 1, wherein the control circuit is configured to provide a drive signal to the synchronous rectifiers that is logically complementary to the drive signal of the primary switches during the synchronous mode, wherein the synchronous mode includes a plurality of phases, and wherein all of the synchronous rectifiers are enabled during at least one phase of the synchronous mode.

9. The apparatus of claim 1, wherein the reference inductor current is a dynamic reference value selected according to the input voltage.

10. The apparatus of claim 1, wherein control circuit is configured to monitor the inductor current by sensing a voltage representative of the inductor current and to use a reference inductor voltage value to represent the reference inductor current.

11. A method of operating a power converter circuit having a primary circuit side and a secondary circuit side, the method comprising:
operating synchronous rectifiers on the secondary circuit side synchronously to primary switches on the primary circuit side when inductor current at an inductor on the secondary side is greater than or equal to a reference inductor current value;
operating the synchronous rectifiers in a bidirectional mode when the inductor current is less than the reference load current value, wherein energy is delivered from the primary circuit side to the secondary circuit side and from the secondary circuit side to the primary circuit side during the bidirectional mode, wherein the bidirectional mode includes multiple phases including: a first phase in which at least a portion of the primary switches are enabled, only a portion of the synchronous rectifiers are enabled, and energy flows from the primary circuit side to the secondary circuit side; a second phase in which the primary switches are disabled, only a portion of the synchronous rectifiers are enabled, and energy flows from the inductor on the secondary circuit side; and a third phase in which the primary switches are disabled, at least a portion of the synchronous rectifiers are enabled, and energy flows from the secondary circuit side to the primary circuit side; and
operating the power converter circuit in a diode mode when the inductor current is less than or equal to the reference inductor current value and an input voltage to the primary side is less than a specified input voltage value, wherein the synchronous rectifiers are disabled during the diode mode.

12. The method of claim 11, wherein, during the bidirectional mode, the synchronous rectifiers are operated according to a duty cycle that is independent of the value of the inductor current.

13. The method of claim 11, wherein less than all of the synchronous rectifiers are enabled at any time during the bidirectional mode.

14. An integrated circuit comprising:
a power converter circuit including a primary circuit side and a secondary circuit side, wherein the primary circuit side includes a plurality of primary switches, wherein the secondary circuit side includes a plurality of synchronous rectifiers and contact pads for connection to an inductor; and a control circuit configured to:
- operate the synchronous rectifiers synchronously with the primary switches when inductor current at the inductor contact pads is greater than or equal to a reference inductor current;
- operate the synchronous rectifiers in a bidirectional mode when the inductor current is less than the reference inductor current, wherein energy is delivered from the primary side to the secondary side, and from the secondary side to the primary side during the bidirectional mode; and
- operate the synchronous rectifiers in a diode mode when the inductor current at the inductor contact pads is less than or equal to the reference inductor current value and an input voltage to the primary side is less than a specified input voltage value, wherein the specified input voltage value is a dynamic reference value selected according to the output voltage, and wherein the control circuit disables the synchronous rectifiers during the diode mode.

15. The integrated circuit of claim 14, wherein the primary circuit side and the secondary circuit side include contact pads for connection to an isolation transformer to electrically isolate the secondary circuit side from the primary circuit side, and wherein a topology of the power converter circuit is a double-ended power converter that provides bidirectional excitation to the isolation transformer.

16. The integrated circuit of claim 14, wherein the control circuit is further configured to operate the primary side and the secondary side in a plurality of phases when in the bidirectional mode, including:
- a first phase in which only a portion of the primary switches and only a portion of the synchronous rectifiers are enabled at any one time to provide energy from the primary circuit side to the secondary circuit side;
- a second phase in which only a portion of the synchronous rectifiers are enabled at any one time and the primary switches are disabled and energy on the secondary circuit side is provided by energy stored by the inductor; and
- a third phase in which at least a portion of the synchronous rectifiers are enabled at any one time and the primary switches are disabled and energy from an output capacitor on the secondary circuit side is provided to the primary circuit side.

* * * * *